(12) United States Patent
Hutter

(10) Patent No.: X424
(45) Date of Patent: Feb. 11, 1803

(54) BRANDY MANUFACTURING/BRANDYMTG.

(76) Inventor: Christopher J. Hutter

Christian Jacob Hutter

The Schedule referred to in these Letters Patent and making part of the same, containing a description in the words of the said Christian Jacob Houtter himself of his improvement Being a method of making Brandy. out of all kinds of Grain or fruit equal in flavour taste and color to the best imported French Brandy The process of extracting the common strong liquor from peaches, apples, Corn, rye &c is well known and needs no descrip tion. This common liquor extracted in the usual way I mix with Charcoals which have been twice glown out in the fire and then pounded or grinded very fine – it requires 10lb. of this charcoal pow der to every 100 Gallons liquor. This mixture I stirr up well twice per day during one week, when I filter it off. This filtered liquor I put in the still and mix it with other 10lb Charcoal powder 10 ounces of highly rectified oil of vitriol (the manner of rectifying which is described below) and 10 gallons common water 90 gallons liquor is then drawn over by distillation. over a slow fire. These 90 gallons of liquor I put in a cask. which was previously burnt out with highly rectified spirits of wine. in which I put several days before it is used a few nutmegs. at the rate of eight to a quart. I then take 5lbs prunes of the best quality. which are well washed, the stones thereof taken out, then well exsiccated pounded as fine as possible, and scalded with 5 gallons boiling water. which has been previously distilled: after this mixture has stood about half an hour. it is poured warm in the cask amongst the liquor. After a few days I take 10 ounces of fishglue (Ichthyocolla) which I dissolve by boiling it in 5 gallons distilled water. and mix this with my liquor. The color I use is made of common sugar burnt right brown. the quantity of which cannot be stipulated as it must be regulated according to the darkness of the color you wish to give the liquor. My Brandy is then made, but as it wants age I use a stick with two thin iron chains with a ball on each end. with which I work once or twice per day. during one month, my liquor very much. at the expiration of 30 days I draw my brandy over into another cask prepared as before described, and thus
I leave it quiet for two or three weeks more, when it is fit for
market. The oil of vitriol which is used by me as above de-
scribed can be rectified in the following manner only, and would
spoil the best brandy if purified in any other method. Take green
vitriol, put it in an iron pan which is pretty wide, and not
too deep, and calcine it, under a continual stirring, untill it is
quite red. Then put it warm in a stone retort, so that not more
than two thirds of the retort is filled, and distill it several days
from the slowest warmth to the greatest possible heat. The acid
which first runs over I throw away being unfit for my use, but
the latter as long as any vapors rise I preserve for my use.
The oil thus received I put in an evaporating dish of glass
and mix every pound thereof with 30 grains powdered saltpetre
and thus I calcine it untill all the volatile sulphur acid is
forced to evaporate, and the oil becomes perfectly white and clear
Lancaster 29th January 1803.

Christian Jacob Hutter

Attest
Francis Nicamiller M.D.
William Rousman

Patent dated 11th February 1803.
Received and Recorded anew Sept. 27. 1853.